US010189349B2

(12) United States Patent
Watanabe et al.

(10) Patent No.: US 10,189,349 B2
(45) Date of Patent: Jan. 29, 2019

(54) SHUTTER DEVICE FOR VEHICLE

(71) Applicant: SHIROKI CORPORATION, Fujisawa-shi (JP)

(72) Inventors: Shinya Watanabe, Fujisawa (JP); Kenji Yamamoto, Fujisawa (JP); Kazuya Yokoyama, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/545,256

(22) PCT Filed: Dec. 22, 2015

(86) PCT No.: PCT/JP2015/085825
§ 371 (c)(1),
(2) Date: Jul. 20, 2017

(87) PCT Pub. No.: WO2016/117269
PCT Pub. Date: Jul. 28, 2016

(65) Prior Publication Data
US 2018/0009313 A1    Jan. 11, 2018

(30) Foreign Application Priority Data

Jan. 23, 2015   (JP) ................................. 2015-011259

(51) Int. Cl.
*B60K 11/08*  (2006.01)
*B60K 11/04*  (2006.01)

(52) U.S. Cl.
CPC ............ *B60K 11/085* (2013.01); *B60K 11/04* (2013.01)

(58) Field of Classification Search
CPC .................................................. B60K 11/085
See application file for complete search history.

(56) References Cited

U.S. PATENT DOCUMENTS

| 8,474,187 B2 * | 7/2013 | Marocco ................. E06B 7/086 |
| | | 49/403 |
| 8,646,552 B2 * | 2/2014 | Evans .................. B60K 11/085 |
| | | 180/68.1 |

(Continued)

FOREIGN PATENT DOCUMENTS

| EP | 2 335 963 A1 | 6/2011 |
| JP | S55-137216 | 3/1979 |

(Continued)

OTHER PUBLICATIONS

International Search Report (ISR) (PCT Form PCT/ISA/210), in PCT/JP2015/085825, dated Mar. 15, 2016.

(Continued)

*Primary Examiner* — Brian L Swenson
(74) *Attorney, Agent, or Firm* — McGinn IP Law Group, PLLC.

(57) ABSTRACT

The present invention provides a shutter device for a vehicle in which a manufacturing cost is reduced.
Provided is a shutter device (1) for a vehicle, which has: a frame member (10) that has an opening provided therein and is mounted on the vehicle; a fin (20) that extends in a first direction; and a rotary shaft unit (40) that pivotably supports the fin (20) on the frame member to be pivotable in the opening of the frame (10). The fin (20) is provided integrally with or independently from the rotary shaft unit (40), and the fin (20) has a uniform sectional shape in the first direction.

9 Claims, 4 Drawing Sheets

(56) References Cited

U.S. PATENT DOCUMENTS

| | | | |
|---|---|---|---|
| 9,533,565 B2* | 1/2017 | Elliott | B60K 11/085 |
| 2012/0012410 A1 | 1/2012 | Hori | |
| 2012/0110909 A1 | 5/2012 | Crane et al. | |
| 2012/0118656 A1* | 5/2012 | Roddy | B60K 11/085 |
| | | | 180/68.1 |
| 2013/0092463 A1* | 4/2013 | Hori | B60K 11/085 |
| | | | 180/68.1 |
| 2013/0284401 A1* | 10/2013 | Kiener | F01P 7/02 |
| | | | 165/98 |
| 2014/0117709 A1* | 5/2014 | Yoo | B60K 11/085 |
| | | | 296/180.1 |
| 2014/0170960 A1* | 6/2014 | Vacca | B60K 11/085 |
| | | | 454/333 |
| 2015/0020758 A1* | 1/2015 | Hosono | B60K 11/085 |
| | | | 123/41.04 |
| 2015/0159541 A1* | 6/2015 | Solazzo | B60K 11/085 |
| | | | 73/114.68 |
| 2017/0080794 A1* | 3/2017 | Yamamoto | B60K 11/04 |
| 2017/0326967 A1* | 11/2017 | Brueckner | B60K 11/085 |

FOREIGN PATENT DOCUMENTS

| | | |
|---|---|---|
| JP | S 58-040520 U | 3/1983 |
| JP | S61-194730 | 12/1986 |
| JP | S 63-000125 U | 1/1988 |
| JP | 2011-143913 A | 7/2011 |
| JP | 2012-035829 A | 2/2012 |
| JP | 2013-203315 A | 10/2013 |

OTHER PUBLICATIONS

PCT/ISA/237 Form in PCT/JP2015/085825, dated Mar. 15, 2016.
Japanese Office Action, dated Aug. 7, 2018, in Japanese Patent Application No. 2015-011259 and English Translation thereof.

* cited by examiner

SHUTTER DEVICE FOR VEHICLE

TECHNICAL FIELD

The present invention relates to a shutter device for a vehicle.

BACKGROUND ART

A shutter device for a vehicle is described in Patent Literature 1. The shutter device for the vehicle is mounted on a front portion of the vehicle. The shutter device for the vehicle is provided with a frame member that defining a rectangular opening, and fins that are provided inside the opening and are pivotably supported on the frame member. A flow rate of air guided into an engine room is changed by controlling postures of the fins, and fuel efficiency or the like can be improved.

CITATION LIST

Patent Literature

[Patent Literature 1]: Japanese Unexamined Patent Application Publication No. 2012-35829

SUMMARY OF THE INVENTION

Technical Problem

Meanwhile, the fins of the shutter device for the vehicle described in Patent Literature 1 are formed by integral molding of a resin. Since sizes or shapes of the fins required according to a type of vehicle mounting the fins therein are different, there is a need to prepare a metal mold for every type of vehicle. Therefore, it becomes a reason to increase a manufacturing cost the shutter device for the vehicle.

Accordingly, the present invention is to provide a shutter device for a vehicle capable of reducing a manufacturing cost and a method of manufacturing the same.

Solution to Problem

A shutter device for a vehicle according to the present invention is a shutter device for a vehicle, which adjusts an amount of air flowing from an outside of a vehicle surface to an inside thereof, and includes:
- a frame member having an opening provided therein and mounted on the vehicle;
- a fin extending in a first direction; and
- a rotary shaft unit configured to pivotally support the fin on the frame member to be pivotable in the opening of the frame member,
- wherein the fin is provided integrally with or independently from the rotary shaft unit, and
- wherein the fin has a uniform sectional shape in the first direction.

According to the shutter device for the vehicle of the present invention, the fin has a uniform sectional shape in the first direction. Therefore, after a long member is integrally formed, the long member is cut at a necessary length, so that the fins having different lengths can be formed. Since there is no need to prepare a different metal mold for each of the fins having different lengths, a manufacturing cost can be reduced.

In said shutter device for the vehicle,
the frame member may have:
- an upper base that extends in a left-and-right direction;
- a lower base that is provided below the upper base and extends in the left-and-right direction, and
- at least two pillars that extend in an up-and-down direction and are connected to the upper base and the lower base,
- wherein the rotary shaft unit may be formed independently from the fin, and
- wherein the fin may be pivotably supported on the pillars via the rotary shaft unit.

When the rotary shaft unit is molded integrally with the fin in the first direction, an opening ratio is reduced by the rotary shaft unit extending in the first direction. However, according to the shutter device for the vehicle having the above configuration, since the rotary shaft unit is provided independently from the fin, the rotary shaft unit can be provided only in a necessary place, such as at a portion corresponding to the pillar. That is, since the rotary shaft unit can be intermittently provided in the first direction, the opening ratio can be enhanced.

In the above-described shutter device for the vehicle according to the present invention,
the fin may have a engaging part having a uniform sectional shape in the first direction, and the rotary shaft unit may be engaged with the engaging part.

According to the shutter device for the vehicle having the above configuration, since the engaging part have the uniform sectional shape in the first direction, the rotary shaft unit engaged with the engaging part can be provided at a desired position. Therefore, the shutter device for the vehicle can be mounted on another type of vehicle by changing the position of the rotary shaft unit.

In the above-described shutter device for the vehicle according to the present invention,
the engaging part may be a groove that is provided in the fin and extends in the first direction of the fin.

According to the shutter device for the vehicle having the above configuration, processing of the engaging part is simple, and a manufacturing cost is easily reduced. Since the engaging parts do not protrude from the fin, the opening ratio of the shutter device for the vehicle in the opened state is easily enhanced.

In the above-described shutter device for the vehicle according to the present invention,
- a plurality of the rotary shaft units may be provided at different positions in the first direction, and
- an interval between a pivot axis of at least one of the rotary shaft unit and the fin may be different from that between a pivot axis of the other rotary shaft unit and the fin.

According to the shutter device for the vehicle having the above configuration, the fin can be made in a round shape according to a shape of the vehicle, and appearance designability of the vehicle can be improved.

Further, according to the present invention, provided is a method of manufacturing a shutter device for a vehicle, the shutter device for the vehicle including: a frame member mounted on the vehicle and having an opening provided therein; a fin configured to extend in a first direction; and a rotary shaft unit configured to pivotally support the fin on the frame member to be pivotable in the opening of the frame member, wherein the fin is integrated with or separated from the rotary shaft unit, and adjusts an amount of air flowing from an outside of a vehicle surface to an inside thereof, the method including:
- molding a long member, which becomes the fin, to have a uniform sectional shape in the first direction;

cutting the long member at a necessary length to obtain the fin; and assembling the fin to the frame member.

According to the method of manufacturing the shutter device for the vehicle according to the present invention, the fin can be obtained by cutting the long member at a necessary length depending on a type of vehicle. Thereby, the shutter device for the vehicle having the fins of various lengths can be manufactured at a low cost.

Advantageous Effects of the Invention

According to the present invention, a shutter device for a vehicle in which a manufacturing cost is reduced and a method of manufacturing the same are provided.

DESCRIPTION OF EMBODIMENTS

Figure 1:
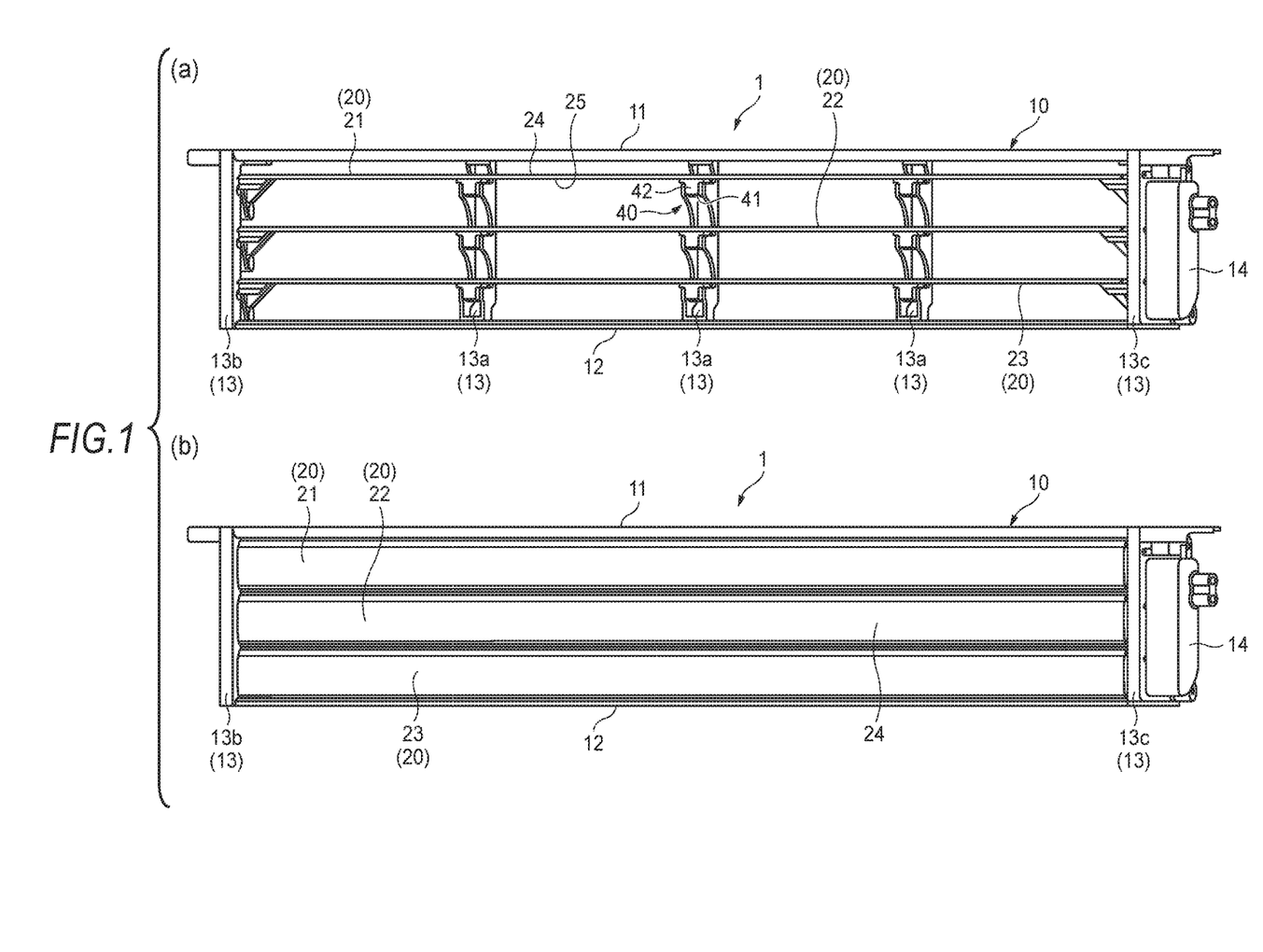
FIG. 1 is a perspective view of a shutter device according to an embodiment of the present invention.

Hereinafter, a shutter device 1 for a vehicle according to an embodiment of the present invention will be described in detail with reference to the drawings. FIG. 1 is a front view of the shutter device for a vehicle according to the present embodiment. FIG. 1(a) illustrates the shutter device 1 for the vehicle in an opened state, and FIG. 1(b) illustrates the shutter device 1 for the vehicle in a closed state.

The shutter device 1 for the vehicle is provided at a front lower portion of the vehicle, and is able to introduce air from the outside of a vehicle surface into the inside (for example an engine room). The shutter device 1 for the vehicle can adjust an amount of the air flowing into the engine room. As illustrated in FIG. 1, the shutter device 1 for the vehicle is provided with a frame member 10, fins 20, and rotary shaft units 40 that rotatably support the fins 20 on the frame member 10. The fins 20 are driven and rotated by a motor 14.

The frame member 10 is a member that defines a rectangular opening on the inside thereof. The frame member 10 is provided with an upper base 11 that extends in a left-and-right direction, a lower base 12 that extends in the left-and-right direction, at least two pillars 13 that extend in an up-and-down direction. The lower base 12 is provided below the upper base 11. The pillars 13 are connected to the upper base 11 and the lower base 12.

In the present embodiment, the pillars 13 include a right pillar 13c that is located at a right end in a front view, a left pillar 13b that is located at a left end in the front view, and three intermediate pillars 13a that are located between the right pillar 13c and the left pillar 13b. A rectangular opening in the front view is defined by the upper base 11, the right pillar 13c, the left pillar 13b, and the lower base 12.

The three fins 20 are pivotably provided inside the opening of the frame member 10. The fins 20 are long wide members extending in a first direction. In the present embodiment, the first direction is equal to the left-and-right direction. The fins 20 are wide members that are integrally molded from a resin. In the following description, wide surfaces of the fins 20 are referred to as principal planes 24.

The rotary shaft unit 40 is provided with a rotary shaft 41 and a bearing 42 that rotatably supports the rotary shaft 41. In the present embodiment, the rotary shaft 41 is provided to the pillar 13, and the bearing 42 is provided to a bearing unit 50 (see FIG. 2) mounted on the fin 20. The rotary shaft 41 has an approximately cylindrical shape, and a long axis thereof extends in the first direction. The rotary shaft 41 can pivot around a pivot axis extending in the first direction. Thereby, the fin 20 is supported on the frame member 10 to be rotatable about the pivot axis extending in the first direction. A sectional shape of the rotary shaft unit 41 may be set as, for instance, a shape that is partly cut out from an approximately circular shape, an approximately elliptical shape, a circular shape, or an elliptical shape.

The fins 20 are pivotably supported on the pillars 13 via the rotary shaft units 40. The fins 20 can pivot around the pivot axes extending in the first direction. The three fins 20 are caused to pivot around the pivot axis extending in the first direction, and thereby can change an opened state and a closed state.

FIG. 1(a) illustrates the shutter device 1 for the vehicle in the opened state. In this state, the principal planes 24 of the fins 20 are directed approximately upward. In this state, the fins 20 are separated from each other, so that a gap occurs between the fins 20 as viewed from the front. In this state, air is introduced from the gap between the fins 20, and is guided into the engine room.

FIG. 1(b) illustrates the shutter device 1 for the vehicle in the closed state. In this state, the principal planes 24 of the fins 20 are directed approximately forward. In this state, at least part of an upper end of the middle fin 22 in the up-and-down direction is in contact with a lower end of the upper fin 21, which is located above the middle fin 22 in the up-and-down direction. At least part of a lower end of the middle fin 22 is in contact with an upper end of the lower fin 23, which is located below the middle fin 22 in the up-and-down direction. A lower end of the lower fin 23 is in contact with the lower base 12. Thereby, the opening of the frame member 10 is closed by the fins 20, and the amount of air flowing into the engine room is blocked.

(Structure of Fin 20)

Figure 2:
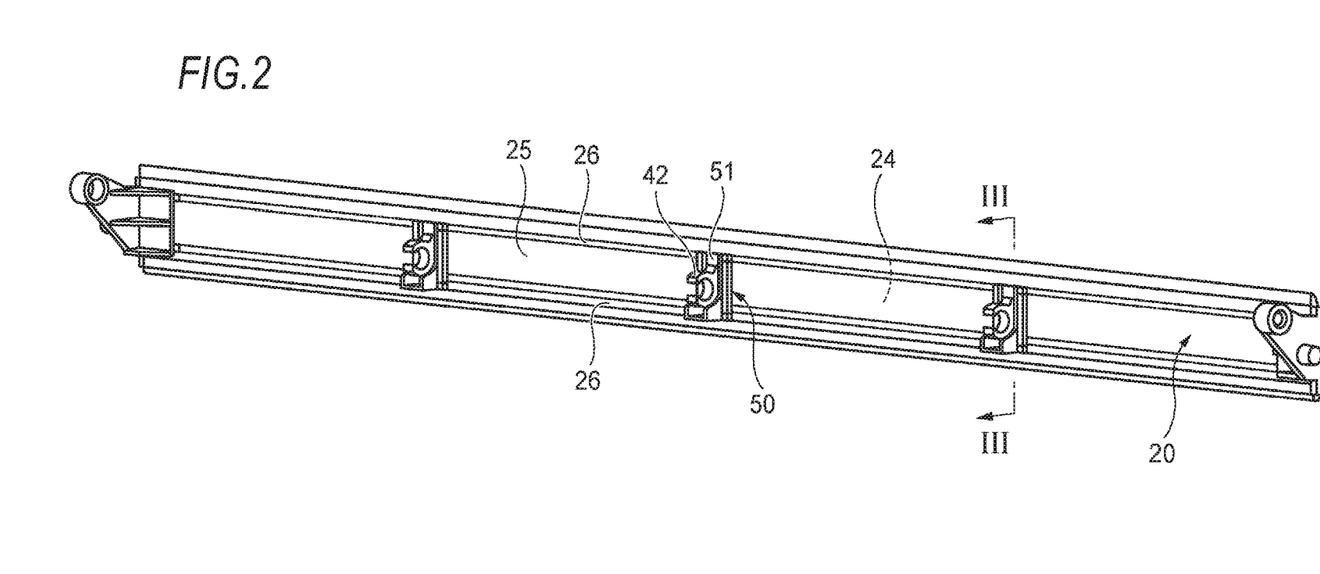
FIG. 2 is a perspective view illustrating a fin and bearings.
Figure 3:
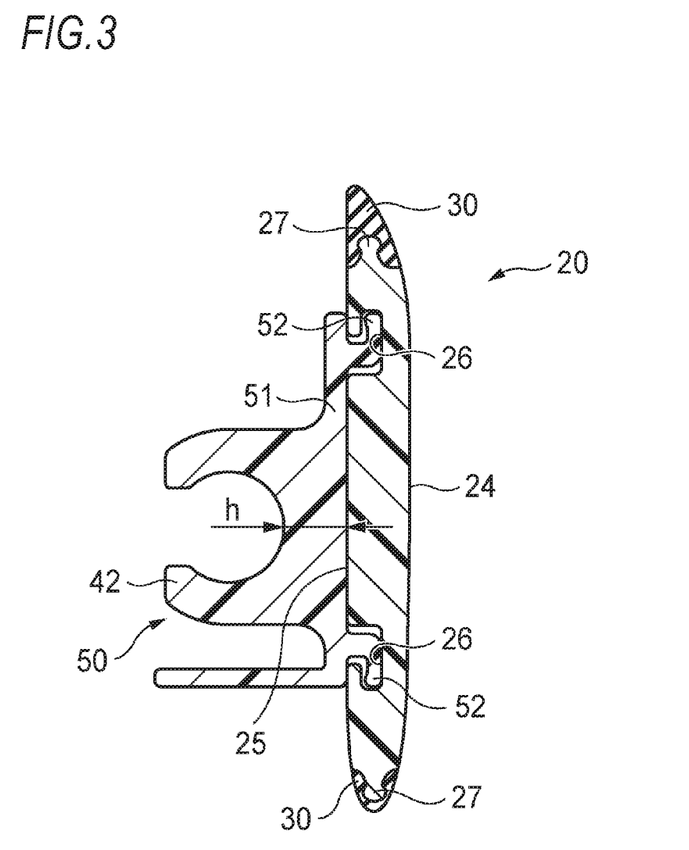
FIG. 3 is a sectional view taken along line of FIG. 2.

FIG. 2 is a perspective view illustrating the fin 20 and the bearings 42 mounted on the fin 20. FIG. 3 is a sectional view taken along line of FIG. 2.

As illustrated in FIG. 2, the fin 20 has a uniform sectional shape in the first direction. As illustrated in FIG. 3, in the present embodiment, two stripes of grooves 26 (an example of engaging parts) extending in the first direction are provided in a rear surface 25 being the opposite side of the principal plane 24. A width dimension of the bottom of the groove 26 (a dimension of the fin 20 in the up-and-down direction) is greater than that of an opening. In the shown example, a sectional shape of the groove 61 is an approximate L shape. In the shown cross section, a space of the bottom of the groove 61 provided close to the upper end of the fin 20 extends toward the upper end of the fin 20. A space of the bottom of the groove 61 provided close to the lower end of the fin 20 extends toward the lower end of the fin 20.

In this cross section, the two stripes of grooves 26 are provided in portions closer to the both ends of the fin 20 than the middle of the fin 20. When the grooves 26 are provided in the both ends of the fin 20, it is easy to enhance strength of the fin 20 compared to the case in which the grooves 26 are provided close to the middle of the fin 20.

Caps 30 formed of a soft resin such as thermoplastic olefin are provided at the both ends of the fin 20 in a width direction. The caps 30 suppress a hit sound caused by contacts between the fins 20 when the shutter device 1 for the vehicle is changed from the opened state to the closed state. The caps 30 are fitted into convex parts 27 provided at the upper and lower ends of the fin 20, and are mounted on the fin 20.

The bearing unit 50 is provided with a plate-like main body 51, two protrusions 52 that are provided on the main body 51 closer to the fin 20, and the bearing 42 that is provided on the main body 51 on a side opposite to the protrusions 52. The bearing 42 can pivotally support the rotary shaft 41 provided on the pillar 13. The two protrusions 52 have shapes corresponding to the respective grooves 26 of the fin 20. The two protrusions 52 are fitted into the respective grooves 26 of the fin 20, and thereby the bearing unit 50 is mounted on the fin 20. Since the openings in the cross sections of the grooves 26 are narrower than the bottoms, the protrusions 52 of the bearing unit 50 hardly drop out of the grooves 26.

The protrusions 52 and the grooves 26 are provided up and down with respect to the bearing 42. Since the bearing 42 are supported by the protrusions 52 and the grooves 26, it is easy to enhance rigidity supporting the fin 20.

(Manufacturing Method)

Next, a method of manufacturing the aforementioned shutter device 1 for the vehicle will be described.

First, a long member to be the fin 20 is molded from a resin to have a uniform sectional shape in a first direction. A sectional shape of the long member is identical to that of the fin 20.

Next, the obtained long member is cut at a necessary length, thereby obtaining the fin 20. To this end, the long member is formed longer than a length required for the fin 20. For example, the long member is preferably greater than twice a dimension of the fin 20 in a longitudinal direction such that a plurality of fins 20 can be obtained from a single long member. In a process of forming the long member to easily obtain a long member, the long member is preferably formed by extrusion molding of a resin. Of course, the long member may be formed using injection molding or the like in addition to the extrusion molding.

After the long member is obtained, various types of post-processing may be performed on the long member. For example, a positioning mark for the bearing unit 50 may be provided on the long member, or bolt holes for fixing the bearing unit 50 may be formed.

The bearing unit 50 and the caps 30 are mounted on the fin 20.

The fin 20 on which the bearing unit 50 and the caps 30 are mounted is assembled to the frame member 10. The rotary shaft 41 of the rotary shaft unit 40 provided on the pillar 13 is fitted into the bearing 42 of the rotary shaft unit 40 provided on the bearing unit 50, and whereby the fin 20 is assembled to the frame member 10.

Meanwhile, the shutter device for the vehicle which is the subject matter of the present invention is different in size required for each type of vehicle. Even in the same type of vehicles, the size of the shutter device for the vehicle may be different if models are different or when the model of the vehicle is changed. Therefore, when new metal molds for the fins of the shutter device for the vehicle are prepared for every vehicle, every model, and every change in model and fins having different sizes are produced, costs are increased.

Therefore, the inventors of the present invention conceived the shutter device 1 for the vehicle having the fins 20 having the uniform sectional shape in the first direction. The inventors also conceived the manufacturing method of cutting the long member longer than the length required for the fins 20 at a necessary length and obtaining the fins 20. Thereby, although the sizes required for the fins 20 are different for every vehicle, every model, and every change in model, it is not necessary to prepare the new metal molds for every fin 20. Thus, the shutter device 1 for the vehicle can be produced at a low cost.

Since each groove 26 has the same sectional shape in the first direction, the bearing unit 50 can be mounted at any position of the fin 20 in the first direction. Therefore, the various fins 20 of the shutter device 1 for the vehicle wherein the fins 20 have different positions at which the bearing unit 50 is mounted can be manufactured using the same long member.

The bearing unit 50 is provided only at a position corresponding to the pillar 13 in the first direction, and is not provided in a space between the pillars 13. Therefore, in the shutter device 1 for the vehicle in the opened state, it is easy to greatly secure the large space between the pillars 13 and the space between the fins 20, and it is easy to secure a large opening ratio of the shutter device 1 for the vehicle.

MODIFIED EXAMPLE

Figure 4:
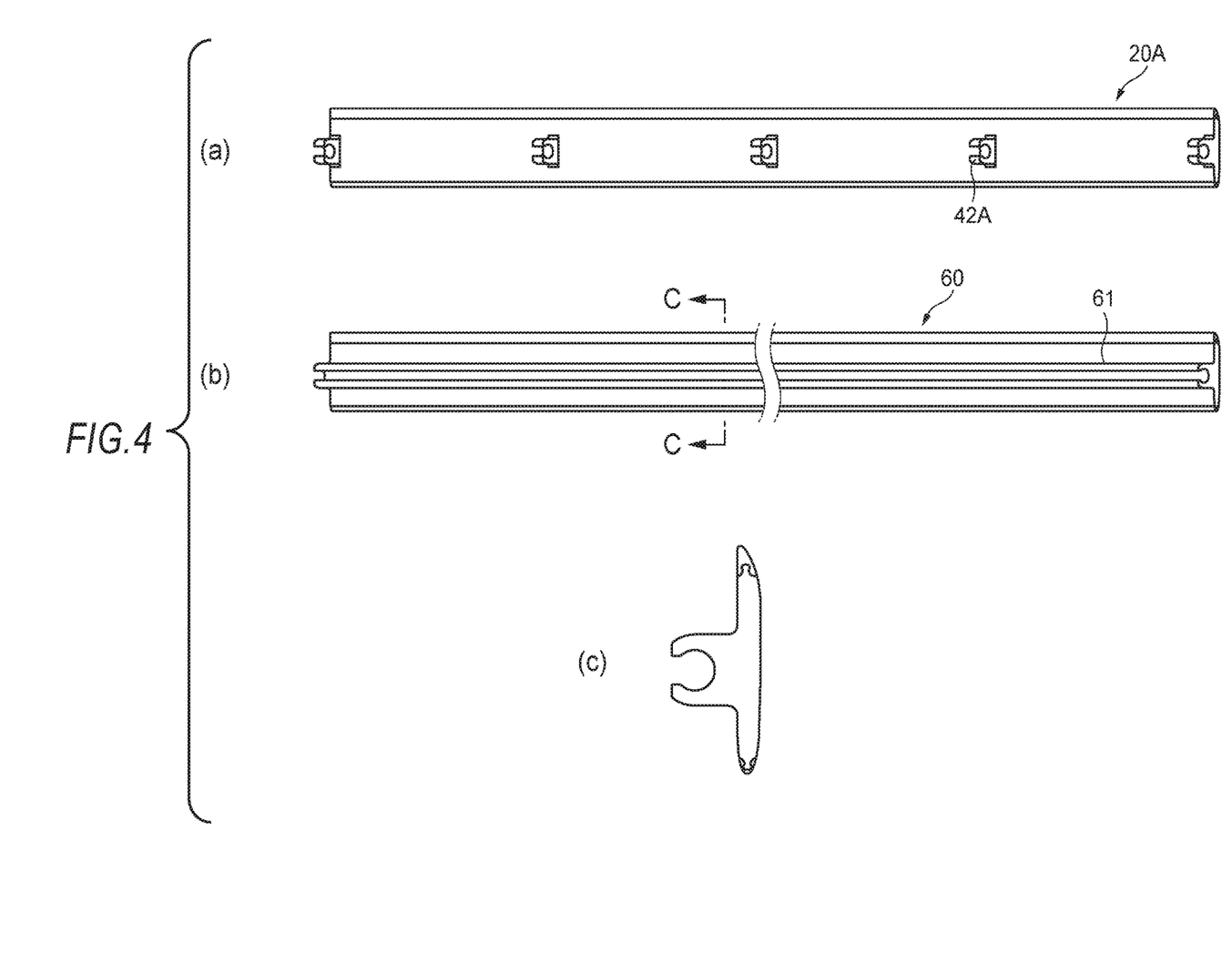
FIG. 4 is a view illustrating a fin and a long member of a shutter device for a vehicle according to a modified example of the present invention.

In the above embodiment, the example in which the fin 20 is separated from the bearing unit 50 (the example of the rotary shaft unit) or the caps 30 has been described. However, the fin 20 may be integrated with the bearing unit (the example of the rotary shaft unit) or the caps. FIG. 4 is a perspective view illustrating a fin 20A of a shutter device for a vehicle according to a modified example of the present invention. FIG. 4(a) is a perspective view of the fin 20A, FIG. 4(b) is a perspective view of a long member 60 for obtaining the fin 20A, and FIG. 4(c) is a sectional view of the long member 60.

As illustrated in FIG. 4(a), in the present modification, a bearing 42A is formed integrally with the fin 20A. This bearing 42A is provided only at a position corresponding to the pillar 13 in a first direction.

As illustrated in FIG. 4(b), the long member 60 for obtaining the fin 20A having this shape is provided with a bearing formation part 61 that serves as the bearing 42A. This bearing formation part 61 has the same sectional shape as the bearing 42 in the first direction.

The fin 20A illustrated in FIG. 4(a) is obtained by cutting the long member 60 illustrated in FIG. 4(b) at a necessary length and cutting off an unnecessary portion of the bearing formation part 61. When the unnecessary bearing formation part 61 is not cut off, a space between the fins 20A is blocked by the bearing formation part 61 when the shutter device 1 for the vehicle is in the opened state. In comparison with the case in which the unnecessary bearing formation part 61 is not cut off, when the unnecessary portion of the bearing formation part 61 is cut off, an opening ratio when the shutter device 1 for the vehicle is in an opened state is easily enhanced.

Even in this modified example, even when the fins 20A having different lengths are required, it is possible to cut the long member 60 at a necessary length and to obtain the fins 20A. Even in this case, since there is no need to prepare a metal mold for every fin 20A, the shutter device for the vehicle can be provided at a low cost.

In the above embodiment, the example in which the plurality of bearing units 50 having the same shape are used has been described. However, a plurality of bearing units in which a distance h (see FIG. 3) between the fin 20 and the center of the bearing 42 that is a pivot axis of the fin 20 is different may be used. For example, an interval h between the fin 20 and the pivot axis of the rotary shaft unit 40 in the middle in a left-and-right direction (an example of the first direction) may be greater than that between the fin 20 and the pivot axis of the rotary shaft unit 40 at both ends in the left-and-right direction. Thus, a shutter device for a vehicle having a shape in which the middle in the left-and-right direction protrudes forward is obtained.

In the aforementioned embodiment, the example in which, regarding the rotary shaft unit, the rotary shaft is provided on the frame member and the bearing unit including the bearing is mounted on the fin has been described, but the present invention is not limited thereto. A configuration in which the bearing is provided on the frame member and the rotary shaft is provided on the fin may be adopted.

In the aforementioned embodiment, the example in which the first direction is identical to the left-and-right direction has been described, but the present invention is not limited thereto. The first direction may be identical to the up-and-down direction, or extend in a direction inclined with respect to the left-and-right direction or the up-and-down direction.

In the aforementioned embodiment, the example in which the fins are supported by each of the pillars has been described, but the present invention is not limited thereto. For example, the fins may be supported only by the pillars at the both ends in the left-and-right direction. Alternatively, the fins may be supported by one or more pillars in the middle in the left-and-right direction.

The structure for fixing the bearing units 50 to the fin 20 is not limited to the protrusions 52 of the bearing units 50 and the grooves 26 of the fin 20. The grooves may be provided in the bearing unit, and the protrusions may be provided on the fin. Alternatively, without being limited to a combination of the groove and the protrusion, a structure for mutually fitting the groove and the protrusion may be adopted.

It is more preferable that the grooves are provided on the fin than that the protrusions are provided on the fin. This is because the opening ratio is easily enhanced in the shutter device for the vehicle in the opened state.

In the aforementioned embodiment, the bearing units 50 mounted on the rear surface 25 of the fin 20 have been described, but the present invention is not limited thereto. For example, the bearing units 50 may be bearing units having the shapes of the caps that are fixed to the fin by covering from the first direction the both ends of the fin in the first direction. In this case, since there is no need to provide the grooves 26 or the like in the fin 20, the shape of the fin 20 can be simplified.

In the aforementioned embodiment, the example in which the first direction is identical to the left-and-right direction has been described, but the present invention is not limited thereto. The first direction may be identical to the up-and-down direction, or extend in the direction inclined with respect to the left-and-right direction or the up-and-down direction.

This application is based on Japanese Patent Application No. 2015-011259, filed on Jan. 23, 2015, the contents of which are incorporated herein by reference.

INDUSTRIAL APPLICABILITY

According to the present invention, the shutter device for the vehicle in which the manufacturing cost is reduced and the method of manufacturing the same are provided.

REFERENCE SIGNS LIST

1: Shutter device for vehicle
10: Frame member
11: Upper base
12: Lower base
13: Pillar
13a: Intermediate pillar
13b: Left pillar
13c: Right pillar
14: Motor
20, 20A: Fin
21: Upper fin
22: Middle fin
23: Lower fin
24: Principal plane
25: Rear surface
26: Groove
27: Convex part
30: Cap
40: Rotary shaft unit
41: Rotary shaft
42, 42A: Bearing
50: Bearing unit
51: Main body
52: Protrusion
42: Bearing
60: Long member
61: Bearing formation part

The invention claimed is:

1. A shutter device for a vehicle, which adjusts an amount of air flowing from an outside of a vehicle surface to an inside thereof the shutter device comprising:
    a frame member having an opening provided therein and a frame-side pivot member, and mounted on the vehicle;
    a fin extending in a first direction; and
    a fin-side pivot member, which is pivotally engaged with the frame-side pivot member to pivotally support the fin on the frame member to be pivotable in the opening of the frame member,
    wherein the fin-side pivot member is provided independently from the fin, and the fin-side pivot member is fixed to the fin,
    wherein the fin has a uniform sectional shape in the first direction, and
    wherein the fin includes an engaging part having a uniform sectional shape throughout the fin in the first direction, and the fin-side pivot member is engaged with the engaging part.

2. The shutter device for the vehicle according to claim 1, wherein the frame member includes:
    an upper base that extends in a left-and-right direction;
    a lower base that is provided below the upper base and extends in the left-and-right direction; and
    at least two pillars that extend in an up-and-down direction and are connected to the upper base and the lower base,
    wherein the fin is pivotably supported on the pillars via the frame-side pivot member and the fin-side pivot member.

3. The shutter device for the vehicle according to claim 1, wherein the engaging part of the fin includes a groove that is provided in the fin and extends in the first direction of the fin.

4. The shutter device for the vehicle according to claim 1, wherein a plurality of fin-side pivot members are provided at different positions in the first direction, and
    wherein an interval between a pivot axis of at least one of the fin-side pivot member and the fin is different from an interval between a pivot axis of an other of the fin-side pivot member and the fin.

5. A method of manufacturing a shutter device for a vehicle, the shutter device for the vehicle including a frame member mounted on the vehicle and having an opening provided therein and a frame-side pivot member, a fin configured to extend in a first direction, and a fin-side pivot member, which is pivotally engaged with the frame-side pivot member to pivotally support the fin on the frame member to be pivotable in the opening of the frame member, wherein the fin-side pivot member is provided independently from the fin, and adjusts an amount of air flowing from an outside of a vehicle surface to an inside thereof, the method comprising:
- molding a long member, which becomes the fin, to have a uniform sectional shape in the first direction;
- cutting the long member at a necessary length to obtain the fin;
- fixing the fin-side pivot member to the fin; and
- assembling the fin to the frame member,
- wherein the fin includes an engaging part having a uniform sectional shape throughout the fin in the first direction.

6. The method of manufacturing the shutter device according to claim 5, wherein the fin-side pivot member is engaged with the engaging part.

7. A shutter device for a vehicle, which adjusts an amount of air flowing from an outside of a vehicle surface to an inside thereof, the shutter device comprising:
- a frame member having an opening provided therein and a plurality of frame-side pivot members, which are arranged at predetermined intervals in a first direction and are mounted on the vehicle;
- a fin extending in a first direction and including an engaging part having a uniform section shape throughout the fin in the first direction; and
- a plurality of fin-side pivot members, which are arranged at the predetermined intervals in the first direction and each of which is fixed to the fin via the engaging part and pivotally engages with each of the plurality of the frame-side pivot members to pivotally support the fin on the frame member to be pivotable in the opening of the frame member,
- wherein the fin has a uniform-sectional shape throughout the fin in the first direction.

8. The shutter device for the vehicle according to claim 7, wherein the fin-side pivot members are provided independently from the fin, and the fin-side pivot members are fixed to the fin.

9. The shutter device for the vehicle according to claim 7, wherein the fin-side pivot members are engaged with the engaging part.

* * * * *